March 9, 1954
C. W. DALEY
2,671,291
GLASSWORKING APPARATUS AND METHOD
Filed June 29, 1950
2 Sheets-Sheet 1
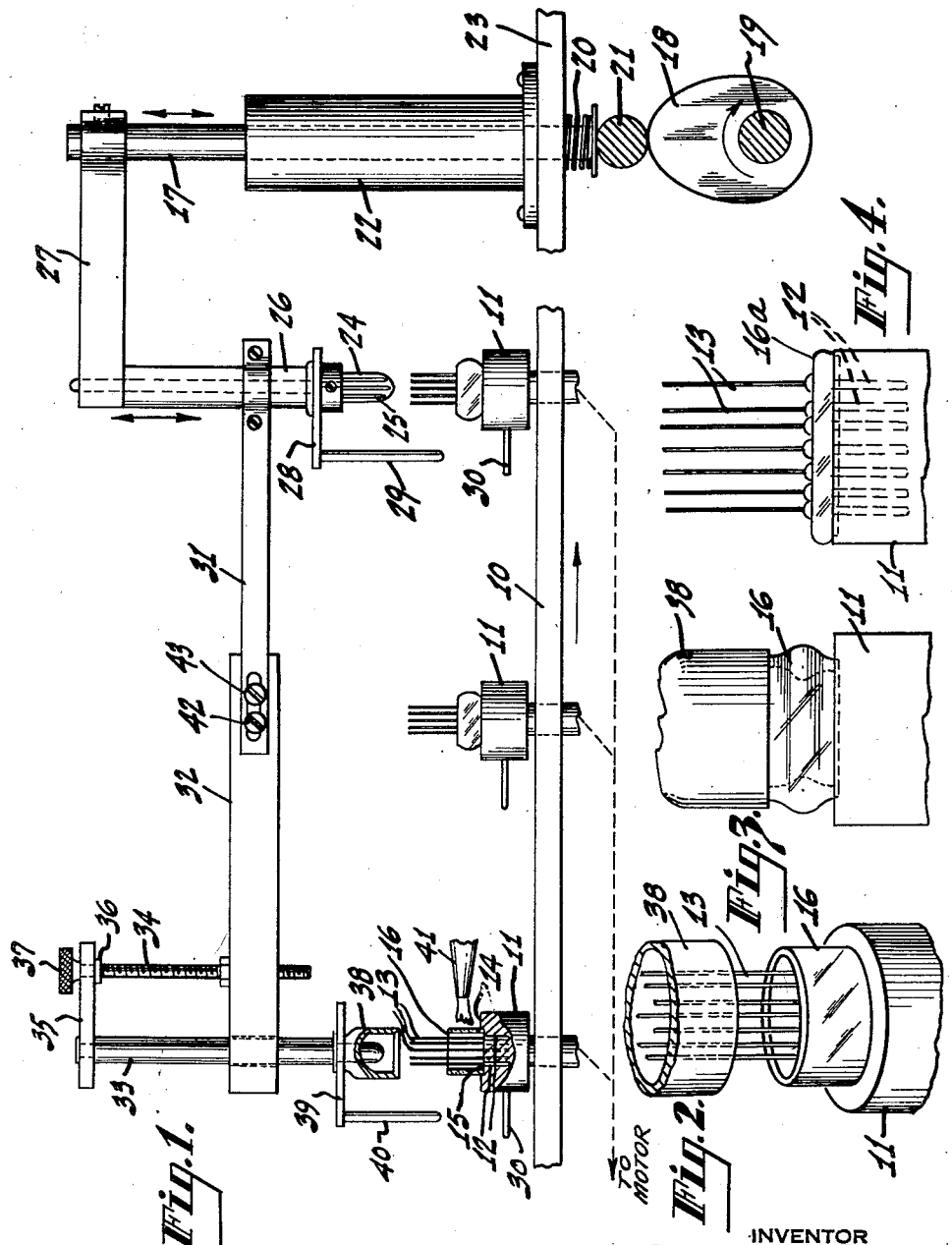
INVENTOR
CHARLES W. DALEY
BY William A. Zalesak
ATTORNEY March 9, 1954 C. W. DALEY 2,671,291
GLASSWORKING APPARATUS AND METHOD
Filed June 29, 1950 2 Sheets-Sheet 2
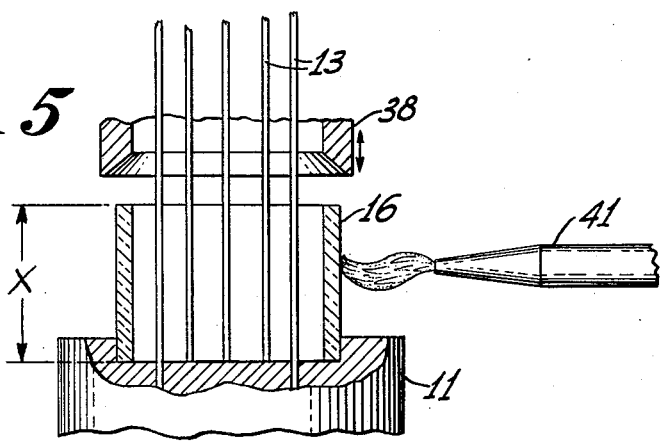
*Fig_5*
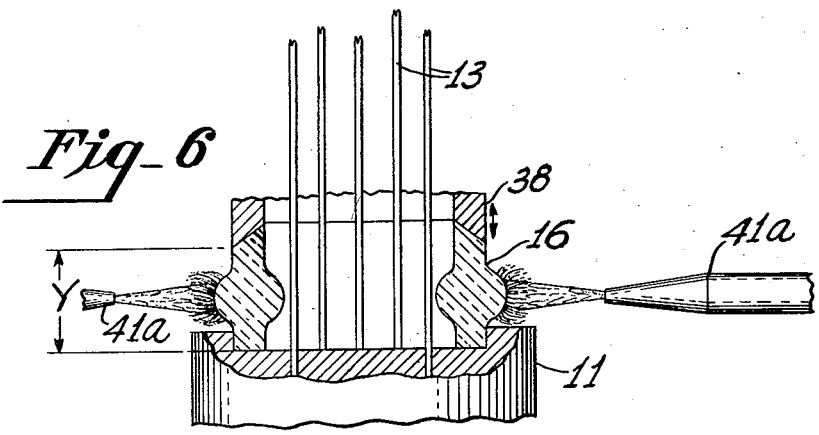
*Fig_6*
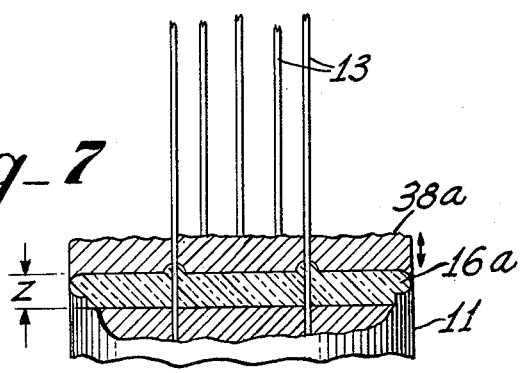
*Fig_7*
INVENTOR.
Charles W. Daley
BY William A. Zaleak
ATTORNEY Patented Mar. 9, 1954

2,671,291

UNITED STATES PATENT OFFICE 2,671,291

GLASSWORKING APPARATUS AND METHOD

Charles W. Daley, Indianapolis, Ind., assignor to Radio Corporation of America, a corporation of Delaware Application June 29, 1950, Serial No. 171,065

4 Claims. (Cl. 49—1)

My invention relates to an apparatus and method for working glass, and more particularly to an apparatus and method for making a composite glass-metal sub-assembly for an electron tube.

Electron tubes generally comprise an electrode assembly supported within an envelope which may be made of either glass or metal. Glass envelopes usually include a tubular portion closed at one end by a stem through which lead-ins serving the electrode assembly extend. Some electron tubes have a flat or button shaped stem. Such stems are usually formed from glass tubes.

For incorporation in an electron tube, the sub-assembly or stem referred to is first joined to the electrode assembly previously mentioned by fixing end portions of the electrodes in the assembly, either directly or by tabs, to the portions of the lead-ins extending from one face of the glass button. The portions of the lead-ins extending from the other face of the stem serve as contact prongs of the completed tube. The structure resulting from fixing the electrode assembly to the lead-ins referred to is an electron tube mount.

The most generally followed practice in fixing the lead-ins to electrodes or electrode tabs, as referred to above, is to weld the parts together. It is essential for good operation of an electron tube that the bond between the lead-ins and the electrodes be relatively strong. One reason for this is that the bond is sometimes relied upon for supporting the electrode assembly. Another important reason for a strong bond is to assure good electrical connections between the lead-ins and electrodes of the tube.

The practices followed heretofore in making a button type stem with lead-ins extending therethrough, has made it difficult to secure strong welds between the lead-ins and the electrodes within the tube. Such prior practices have involved forming glass tubes to flat button shape by heating the tubes to relatively soft plastic form by directing fires thereto and then forcefully applying a former to the softened glass to flatten the tube. Before a tube is flattened it has substantial length and is therefore coextensive with a substantial longitudinal portion of the lead-ins it surrounds prior to the stem forming operation. The fires or flames employed in heating the tubes to plastic state, exert a measurable pressure on the tubes. When a tube is softened prior to the forming operation, this pressure will cause portions of the softened tube near the upper end thereof to extend inwardly and contact the lead-ins. Some of the softened glass thus coming into contact with the lead-ins, will stick thereto. The stem former heretofore employed to flatten the softened tubes is incapable of removing all of the glass that has become stuck to the lead-ins. After the stem is formed therefore, glass will be found to adhere to the lead-ins at portions thereof spaced from the stem and to which welded connections are later made when the stem is incorporated in a mount.

The glass on the lead-ins spaced from the stem, prevents a good weld between the lead-ins and electrodes or electrode tabs of a mount. This is because the glass coating prevents a metal-to-metal contact between these parts. Resistance welding usually employed requires a metal-to-metal contact. Any interference with or reduction in the area of such contact will reduce welding current flow through the parts, thereby either completely failing to accomplish a weld, or forming a relatively weak weld. Since a good weld between the lead-ins and internal elements of an electron tube are important, as noted before herein, for a good tube, a serious problem is presented by prior machines and methods of forming electron tube mounts.

Another problem is presented. Stem-making machines as used in the art are provided with work stations at which operations required for making a stem are performed. These operations have become standard and cannot be eliminated. Therefore, to add a further station for accomplishing the purposes of the invention requires either that an entirely new machine be constructed having the additional station, or that the added station be integrated with existing machines.

It is therefore an object of the invention to provide an improved electron tube making apparatus and method.

A further object is to provide an apparatus and method of making an electron tube stem having lead-ins extending therethrough wherein the lead-ins are adapted to form good welds with internal elements of the tube.

Another object is to provide an improved apparatus for making electron tube stems to which existing stem making apparatus is readily convertible.

A further object is to add an additional processing station to a conventional stem making machine with reduced structural change in such machine.

Another object is to provide an apparatus for making flat glass stems having lead-ins extending therethrough wherein the lead-ins are free from glass at portions thereof spaced from the stem.

A further object is to provide an apparatus for making a flat button type stem having lead-ins extending therethrough wherein the lead-ins are free from contamination adversely affecting good seals thereof to other electron tube components.

Another object is to provide an apparatus for making a flat button type glass stem having lead-ins extending therethrough, from work pieces including a glass tube and lead-ins, wherein the glass tube is spaced from the lead-ins during the initial portion of the operation of the apparatus to prevent contact with portions of the lead-ins spaced from the ultimate stem.

A further object is to provide an improved glass forming apparatus having an initial station for forming the glass into a shape intermediate its original shape and the ultimate shape desired for spacing the glass from predetermined portions of metal parts to be integrated with the ultimate glass shape.

Another object is to provide an apparatus for making a flat glass stem from a glass tube and including a station for preliminarily forming said tube to doughnut shape to prevent glass contact with predetermined portions of metal lead-ins to be sealed through the stem.

A further object is to provide an improved method of forming glass whereby the glass is formed to intermediate shape while substantially self-supporting and only slightly plastic for preventing adherence of the glass to predetermined portions of metal parts to be sealed to the glass simultaneously with the sealing operation.

Another object is to provide a method of making a flat glass stem having lead-ins extending therethrough from parts including a glass tube, wherein the glass tube is first only slightly softened and compressed axially to doughnut form to space an end portion of the tube from the lead-ins to prevent glass adherence to the lead-ins at portions thereof spaced from the location of a desired seal between the glass and the lead-ins.

The foregoing objects are attained according to an embodiment of the invention by adding a preforming station to a conventional stem making machine. Conventional stem making machines include a plurality of stations through which work pieces are intermittently indexed by a turret. The turret is provided with a plurality of heads or sealing pins, each adapted to receive lead-in wires and a glass tube for processing at the stations referred to to form a flat glass stem having lead-ins extending therethrough. The stations are spaced so that the turret requires several indexing motions for transporting the work pieces from one station to the next adjacent station. Gas burners are disposed intermediate the stations for softening the glass of the tube.

One of the initial stations to which the work pieces are carried is a station at which the lead-ins are straightened. This station includes a die having vertically disposed grooves and supported above the work pieces on an axially movable vertical shaft. Vertical movement of the shaft causes the die to engage the lead-ins to properly dispose them on the sealing pin on which they rest in relation to a glass tube on the pin.

According to the invention there is affixed to the shaft referred to for vertical movement therewith, an assembly including an arm extending horizontally and fixed at one end to the shaft referred to and having at the other end a glass forming member. The length of the arm is such that when a sealing pin is indexed into position at the straightening station, the glass forming member is above and in registry with another sealing pin and the glass tube thereon, intermediate the straightening station and an adjacent station. The vertical position of the glass forming member is adjustable so that a downward movement of the shaft on which the arm referred to is mounted, results in a downward stroke of desired magnitude by the glass forming member. This stroke is applied to the top of a partly softened tube resulting in imparting a doughnut shape to the tube.

An advantage of thus shaping the glass when in a partly plastic state is that the glass is not soft enough to move freely or to stick to adjacent lead-ins. Furthermore the forming operation does not involve a force component bringing the glass tube into contact with the lead-ins, as is the case when the tube is softened by a highly plastic state by laterally applied flames. Further softening of the now doughnut shaped tube at further stations of the apparatus by gas flames has a negligible effect on the relative positions of the tube and the lead-ins due to the more concentrated mass of the tube. When the doughnut shaped tube is sufficiently softened it is further formed by another glass forming member to flat shape. This causes the glass of the tube to cover the upper surface of the sealing pin and to be sealed around the lead-ins in hermetically tight seals. No glass will be found on the lead-ins at portions thereof spaced from the locations of the seals referred to. Such portions therefore are well suited for making good welds to parts to be fixed thereto.

Further objects and advantages of the invention will become apparent as the description proceeds. While the invention is pointed out with particularity in the appended claims, it may best be understood from the following detailed description of an embodiment thereof presented for purposes of illustration only, taken in connection with the appended drawing in which:

Figure 1 is an elevation partly in section of a portion of a stem making apparatus incorporating the novel glass working feature of the invention;

Figure 2 is an enlarged perspective view partly in section of a sealing pin and glass working member according to the invention, and shows a glass tube and a plurality of lead-ins supported on the sealing pin;

Figure 3 is a side view of my novel glass forming member applying a downward stroke to a partly softened glass tube to form the tube to doughnut shape;

Figure 4 is a side view of a flat glass stem having lead-ins extending therethrough made by my novel apparatus and method.

Figure 5 is an enlarged elevational view partly in cross-section of a portion of the apparatus shown in Figure 1;

Figure 6 is an enlarged elevation party in section of the intermediate doughnut form of a glass tube, shown in Figure 3, and processed according to the invention; and Figure 7 is an enlarged elevational view partly in section of a finished stem according to the invention.

Referring in more detail to the drawing, there is shown in Figure 1 thereof an apparatus incorporating the invention. The apparatus includes a turret 10 of generally round shape in a horizontal plane, supporting adjacent its periphery a plurality of heads or sealing pins 11. The sealing pins are rotated by a power source, not shown, for uniformity in processing. Each sealing pin is provided with a plurality of openings 12 having equal lengths and disposed in a circular array concentric with the pin 11 for receiving a plurality of lead-in wires 13. The upper surfaces 14 of the sealing pins lie in a horizontal plane and are provided with a centrally disposed depressed portion 15 for receiving, supporting and centering thereon a glass tube 16. The tube 16 is formed by the apparatus to a flat button-like shape 16a shown in Figure 4.

The turret 10 is rotatable by a power source, not shown, in the direction indicated by the arrow in intermittent movements. These intermittent movements dispose the heads or sealing pins 11 successively adjacent a plurality of processing stations, having a plurality of processing members, one of which is shown. This station is provided with a processing member for straightening the lead-in wires 13 and is disposed adjacent a loading station, not shown, of the apparatus. The straightening processing member includes a vertical shaft 17 axially movable. A cam 18 mounted on shaft 19 is rotatable by a power source, not shown, and serves to move the shaft 17 upwardly. Suitable means such as a spring 20 causes the shaft 17 to move downwardly and to follow the cam 18. The cam 18 may directly engage the lower end of shaft 17 or it may engage an arm 21 fixed to the shaft and extending at right angles therefrom. Means such as a sleeve 22 fixed to support 23 may be employed to guide the upward and downward travel of shaft 17.

Attached to shaft 17 and movable vertically therewith is a wire straightening die 24 in the form of a solid bar with a rounded end and having a plurality of vertical grooves 25 in its periphery. The die 24 is rotatable on a support 26 fixed to shaft 17 by arm 27. The die is provided with a horizontally extending arm 28 to the free end of which is fixed a downwardly projecting pin 29. When the die 24 moves downwardly the pin 29 fixed thereto engages a pin 30 extending laterally from the sealing pin 11. This engagement causes the grooves 25 to be placed in registry with the openings 12 in pin 11 and desired positions of the lead-ins 13 disposed in said openings. The engagement also causes the die 24 to rotate with the rotating pin to preserve the registry referred to. The lower end of the die 24 is rounded to facilitate entrance of misaligned lead-in wires into the grooves referred to for alignment into erect position.

As shown in Figure 1, each of the pins 11 is in a stationary position between intermittent movements of the turret 10. Two stationary positions are depicted in advance of the wire straightening station. These two positions may be between a loading station, not shown, and the straightening station referred to. Normally, no operation other than heating is performed when the pins are disposed in the two intermediate positions mentioned.

However, according to the invention one of these intermediate positions of the pins 11 is utilized for a novel glass working operation. For example, as shown in Figure 1, the second intermediate position of a pin 11 in advance of the wire straightening station is adopted as a station at which the novel operation according to the invention is carried out. The structure for accomplishing the operation and the nature of the operation will become clear from the following description.

The structure for accomplishing the operation referred to includes an arm 31 fixed at one end to the vertically movable support 26 as by clamps and extends horizontally therefrom. To the other end of arm 31 is adjustably fixed one end of a bracket 32. This bracket also extends horizontally and in line with arm 31. To the free end of bracket 32 is adjustably fixed a glass forming assembly. This assembly includes a vertical shaft 33 vertically adjustable by means of a screw 34 threadable into bracket 32 for axial movement. Axial movement of screw 34 also transmits axial movement to shaft 33 through arm 35 fixed to the upper end of shaft 33 and engaging screw 34. Screw 34 is rotatable with respect to the arm 35 but fixed against axial movement in relation thereto by a washer 36 and nut 37 fixed to the screw. Adjacent the lower end of shaft 33 is mounted for rotation a glass forming member 38 having a horizontal arm 39 and a vertical pin 40 extending downwardly from the arm for a purpose to be described. A burner 41 is positioned to play a relatively soft flame on the glass tube 16 supported on pin 11.

The arm 31 and bracket 32 are adjustable in overall length by means of set screws 42, 43 so that the glass forming member 38 may be positioned above and in registry with the glass tube 16 on sealing pin 11. The member 38 is cup-shaped with the bottom of the cup extending upwardly and supported by the shaft 33. The open end of the member extends downwardly and has a diameter that is substantially the same as that of the glass tube 16.

The nature of the operation of the apparatus according to the invention may be described in relation to the portion of a stem making apparatus shown in Figure 1. In prior art stem making machines, the first station is a loading station, the second station is a lead-in straightening station, and the third station is a heating station for softening the glass tube in preparation for a subsequent tube flattening station. The machine of the invention also employs these stations, and in addition includes at least one additional station between the loading station and the lead straightening station. This additional station is the novel glass working or forming station of the invention. The reason for this preference in the order of the stations aforementioned is that the glass forming operation according to the invention is a preliminary operation and should be performed before the tubes are heated to a relatively soft plastic state in preparation for the stem forming step.

In operation, a sealing pin 11 loaded with work pieces comprising a glass tube 16 and a plurality of lead-ins 13, is indexed into position below the glass forming member 38. This member as well as the straightening die 25 are held in raised position by cam 19 during movements of the turret. When an indexing movement of the turret is completed cam 19 releases pressure on arm 21 resulting in a downward movement of the straightening die 25 and the glass forming member 38 in response to the downward force exerted by spring 20. The pins 11 are caused to rotate by a power source, not shown, and such rotation is transmitted to the straightening die 25 and the glass forming member 38 by engagement between pins 29 and 30 and pins 40 and 30.

The downward movement referred to of member 38 causes its lower rim to engage the upper end of the glass tube 16 now partly softened by the flame from burner 41, and to exert a downward force thereon. This downward force causes the tube 16 to collapse as shown in Figure 3 to assume roughly a doughnut shape and to displace a portion of the glass tube adjacent its upper end, axially with respect to wire lead-ins 13, and laterally expose a portion of said wire lead-ins. This shape results from the pressing force applied to the tube as a consequence of which the glass of the tube is concentrated in a relatively thick ring intermediate the ends of the tube. Since the force applied by the member 38 to the tube 16 is vertical, the glass of the tube is pushed downwardly parallel to the lead-ins 13. This assures a desired spacing between the upper portion of the tube and the lead-ins.

While the relatively massive collection of glass intermediate the ends of the tube will cause the tube to bulge inwardly as well as outwardly, as shown in Figure 6, the inward bulge occasions no difficulty in practicing the invention. This is for the reason that the location of the inward bulge is relatively close to the upper surface of the sealing pin 11 and the location of the ultimate flat stem to which the tube is formed at later stations, on the apparatus, one of which is shown in Figure 7. Furthermore, the magnitude of the downward thrust of the glass forming member 38 is controlled by the adjustment permitted by screw 34 so that this thrust is less than that required for causing the inward bulge of the tube to reach the lead-in array. In addition, the relatively soft flame directed to the tube by the burner 41 only slightly softens the glass of the tube so that it is characterized by substantial resistance to flowing movement. This resistance to flow also serves to keep the glass of the tube away from the lead-ins.

This doughnut form which the tube is given by the apparatus according to the invention not only maintains separation between the glass and the lead-ins during its formation, but also aids in preventing undesired glass adherence to the lead-ins during the subsequent stem forming operations when relatively sharp and hot flames 41a (Figure 6) are played on the tube. The enlarged middle portion of the bead resulting from processing by the apparatus of the invention, gives added rigidity and support to the tube in the presence of the relatively hot flames referred to. Thus the tube has increased resistance to flowing inwardly to the lead-ins in response to the forces applied to it by the flames. This prevents glass adherence to portions of the lead-ins spaced from the ultimate stem as shown in Figures 4 and 7. The lead-ins 13 of the stem are thus free from glass except where they are sealed through the stem 16a.

This aspect of the invention may be understood more clearly by referring to Figures 5, 6 and 7. In Figure 5 are indicated the relative positions of the glass tube 16 and lead-ins 13. It will be noted that a longitudinal portion of the lead-ins is co-extensive with the glass tube 16. This longitudinal portion may be said to constitute an area of the lead-in that is in registry with an area of the inner portion of the glass tube. The registering areas referred to extend longitudinally of the glass tube and lead-ins a distance indicated by the letter "X."

After the tube 16 has been compressed axially by the forming member 38, as shown in Figure 6, the coextensive or registering portions of the glass tube 16 and lead-ins 13 are appreciably reduced, by the shortening of the glass tube referred to. The glass tube and lead-ins now have registering areas extending longitudinally of the tube member, only the distance indicated by the letter "Y" which is shorter than the distance "X" aforementioned.

When the tube 16 has been fully formed by the former 38a to desired flattened shape to provide stem 16a shown in Figures 4 and 7, only relatively short portions of the lead-ins 13 and the stem 16a are coextensive, and therefore the length of their registering or coextensive areas is relatively small as indicated by the letter "Z."

From the foregoing, it will be appreciated that the step of forming the glass tube 16 to doughnut shape prior to forming to flat stem shape, reduces the length axially of the lead-ins of the registering or coextensive portions of the glass tube and lead-ins. This reduces the likelihood of glass contamination of the lead-ins at regions thereof appreciably spaced from the flat stem 16a. That this is so will be readily apparent from Figure 6, wherein the greatest degree of bulge of the doughnut form and consequently the portion of the doughnut form closest to the lead-ins 13, occurs relatively close to the portion or region of the lead-ins to which the flat stem 16a (Figure 7) ultimately becomes sealed.

It will be noted that the two operations of glass working and lead-in straightening are performed during a single actuation of shaft 17 by spring 20. Furthermore the apparatus of the invention may utilize conventional stem-making machines in combination with a glass forming assembly with a minimum of change in the machine. This results in economy in practicing the invention. Applicant's combination moreover affects the entire operation of the stem making machine in that it permits such machine to form stems without objectionable glass adhering to portions of the lead-in to be joined in welds to other electron tube components. The apparatus according to the invention is therefore adapted to fabricate stems having characteristics for improving electron tubes with which they are subsequently associated.

It is obvious that many modifications may be made in the apparatus described without departing from the spirit of the invention and it is accordingly desired to include such modifications within the scope of the appended claims.

I claim:

1. Method of making a flat glass button type of stem having lead-ins extending therethrough from work pieces including a glass tube and a plurality of lead-in wires comprising the steps of supporting said tube and said lead-in wires in upright positions with said wires disposed in a predetermined array within said tube and with said tube and wires having predetermined registering areas, heating said tube moderately to semi-plastic but self-supporting state, compressing said tube axially to a limited extent and less than that required for flattening the tube to reduce said registering areas of said tube and wires, and subsequently heating the compressed tube to a fully-plastic state and further compressing said tube to flat button shape, whereby said wires are sealed through said flat button shape along a limited longitudinal portion of the wires, and other longitudinal portions of said wires are free from glass contamination for forming good welds.

2. Method of axially flattening a glass tube to disc shape adjacent a wire to extend through said disc shape, comprising the steps of heating said glass tube to a limited plastic state, supporting one end of said tube, compressing said glass tube from the opposite end thereof while in said limited plastic state to a doughnut shape, whereby a portion of said glass tube adjacent said opposite end thereof is axially displaced with respect to said wire without contacting the same and laterally exposes a portion of said wire, and further heating said glass tube to fully plastic state and forming the same to disc shape surrounding said wire, whereby said portion of said wire is free from glass and is adapted to form a good weld with other metal parts.

3. Method of working a glass tube adjacent a metal body wherein said tube and body have predetermined registering areas, including the steps of heating said glass tube to render the same semi-plastic while preserving its self-supporting characteristic, compressing said glass tube in a direction parallel to said metal body, whereby said registering areas are reduced, and further heating to a fully plastic state and compressing said glass tube to seal the same to said metal body.

4. In an apparatus for forming a glass tube to flattened shape to provide a flat stem having lead-ins extending therethrough and including means for heating said glass tube; the improvement comprising a processing means having spaced glass forming and wire straightening members, said glass forming member having an annular surface co-extensive with an end surface of said tube and being movable to compress said tube axially after partial heating to a length intermediate the original length of said tube and the thickness of said stem, said straightening member being movable to engage said lead-ins for straightening the same, a support for said glass tube and lead-ins movable successively to said glass forming member and to said wire straightening member, and adjustable connecting means between said glass forming member and said wire straightening member, for causing said wire straightening member to engage portions of said lead-ins exposed by compression of said glass tube.

CHARLES W. DALEY.

References Cited in the file of this patent

UNITED STATES PATENTS

| Number | Name | Date |
|---|---|---|
| 796,470 | Swan | Aug. 8, 1905 |
| 1,640,442 | De Jong | Aug. 30, 1927 |
| 1,965,408 | Eden et al. | July 3, 1934 |
| 2,195,483 | Franke | Apr. 2, 1940 |
| 2,306,163 | Greifendorf | Dec. 22, 1942 |
| 2,324,385 | Gustin et al. | July 13, 1943 |
| 2,497,545 | Greiner | Feb. 14, 1950 |